United States Patent
Moore et al.

[15] 3,675,943
[45] July 11, 1972

[54] SPLASH GUARD FOR TRUCKS

[72] Inventors: Peter N. Moore; Leo F. Pierce, both of 117 S.W. 23, Oklahoma City, Okla. 73109

[22] Filed: Sept. 18, 1970

[21] Appl. No.: 73,525

[52] U.S. Cl. ...................................................280/154.5 R
[51] Int. Cl. ....................................................B62d 25/16
[58] Field of Search ........................................280/154.5 R

[56] References Cited

UNITED STATES PATENTS

| | | | |
|---|---|---|---|
| 3,560,021 | 2/1971 | Watson | 280/154.5 |
| 2,865,655 | 12/1958 | Boysen | 280/154.5 |
| 3,051,508 | 8/1962 | Federspiel | 280/154.5 |

*Primary Examiner*—Benjamin Hersh
*Assistant Examiner*—Robert R. Song
*Attorney*—Robert K. Rhea

[57] ABSTRACT

A bracket secured to the lateral side of a truck bed or frame vertically supports a mud flap laterally of the truck wheel position. Bracket means extending between the wheel hub and the mud flap maintains it in parallel spaced relation with respect to the plane of the lateral side of the truck wheel.

2 Claims, 2 Drawing Figures

PATENTED JUL 11 1972 3,675,943

PETER N. MOORE
LEO F. PIERCE
INVENTORS.

BY
Robert K. Rhea
AGENT

SPLASH GUARD FOR TRUCKS

BACKGROUND OF THE INVENTION

1. Field of the Invention

The present invention relates to mud flaps for trucks and more particularly to a means for mounting a mud flap laterally of truck wheels.

It is common practice to provide trucks with mud flaps for the rearward most wheels of a truck to prevent muddy water, rocks, and the like, picked up by the wheels of the truck from being thrown rearwardly and impinging on the forward end surface of following vehicles. These rearwardly mounted mud flaps do not protect muddy water or slush being thrown laterally upward and against passing vehicles.

This invention contemplates connecting a mud flap with the truck so that the mud flap is positioned in parallel spaced relation with respect to the laterally outward vertical plane of truck wheels and tires.

2. Description of the Prior Art

We do not know of any patents disclosing mud flaps mounted on a truck laterally of the truck wheel position.

SUMMARY OF THE INVENTION

A mud flap is supported in vertical parallel relation with respect to a truck wheel by an angle bracket connecting the upper edge portion of the mud flap to a truck body or frame. Strap iron bracket means is interposed between the mud flap and the truck wheel hub and connected respectively to the hub and mud flap. Vertical slots formed in the mud flap permit movement of bolts connecting the mud flap to the other bracket means to compensate for spring action resulting in vertical movement of the truck wheel with respect to the truck frame or body.

The principal object of this invention is to provide a mud flap and means for mounting it in vertical spaced relation laterally of a truck wheel.

DESCRIPTION OF THE PREFERRED EMBODIMENT

Figure 1:
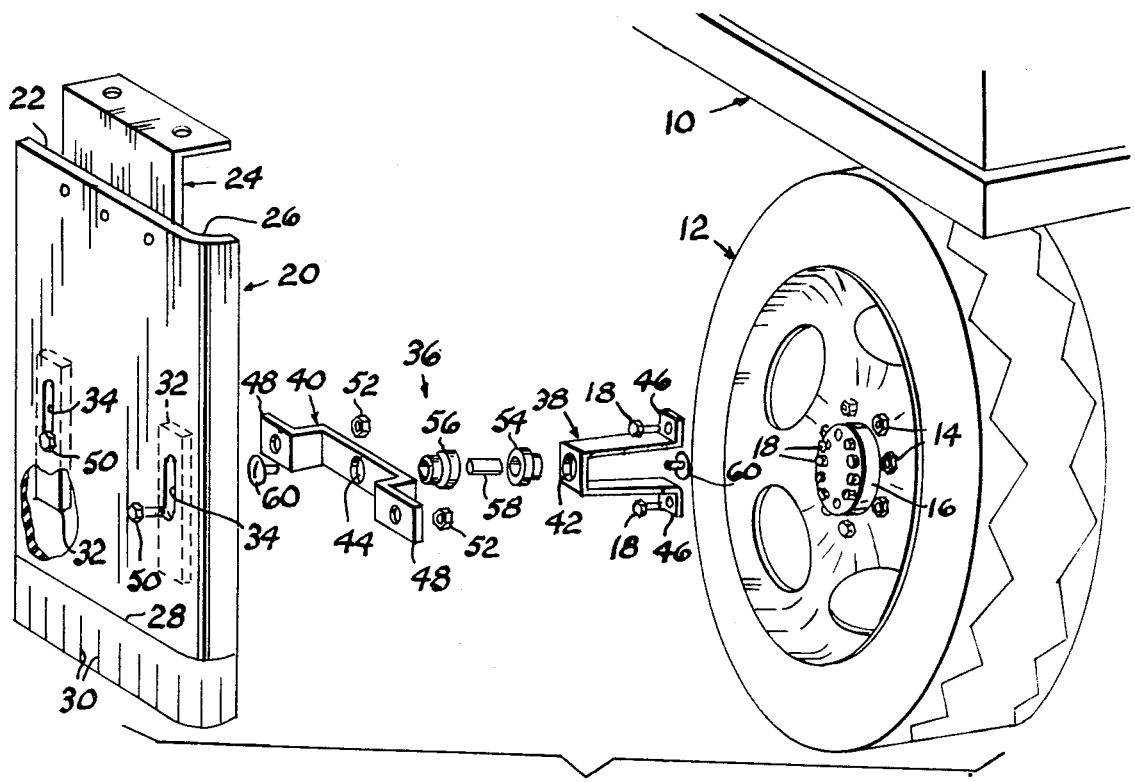
FIG. 1 is a fragmentary exploded perspective view of the mud flap and its mounting brackets connecting the mud flap to a truck; and, FIG. 2 is a fragmentary perspective view of the mud flap when mounted on the truck.
Figure 2:
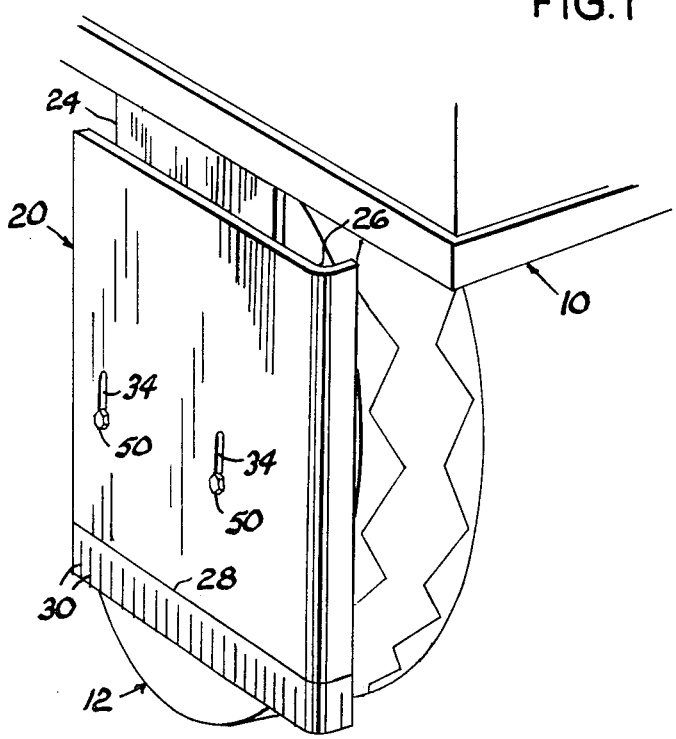

Like characters of reference designate like parts in those figures of the drawings in which they occur.

In the drawings:

The reference numeral 10 indicates a fragment of a truck body having a wheel and tire 12 connected with the brake drum, not shown, of a truck by lug bolts 14. The hub, indicated at 16, normally projects coaxially through the truck wheel and is provided with a plurality of stud bolts 18.

The mud flap, indicated generally at 20, comprises a panel-like section of reinforced resilient material, such as rubber, having a desired thickness. The upper edge portion 22 of the mud flap is connected with one flange of an angle bracket 24 with the other flange of the bracket secured to the depending surface of the truck bed 10 thus positioning the mud flap in parallel spaced relation with respect to the vertical plane of the outer surface of the truck wheel and tire 12. The mud flap is further characterized by its trailing vertical edge portion being turned arcuately inward, as at 26, to extend inwardly of the vertical plane of the mud flap in a slight wrap-around configuration with respect to the rearward limit of the tire 12 for the purpose of deflecting mud and water or the like thrown rearwardly and upwardly by the periphery and laterally outward surfaces of the wheel.

The depending edge portion of the mud flap, extending below the line 28, is vertically slotted or slit, as indicated by the vertical lines 30, to permit the depending edge portion of the mud flap to pass over obstructions on the roadbed, such as small rocks or other articles, wherein gravity and the resiliency of the material returns it to a vertically disposed position after passing over such obstructions. The mud flap is preferably reinforced by a pair of strap-like metallic members 32 interposed between layers of the material forming the mud flap or molded therein during its construction. Each of these stiffeners 32 are provided with longitudinally extending slots 34 cooperatively aligned with similarly shaped openings formed in the material of the mud flap overlying the stiffeners for the purposes presently explained.

Strap-like bracket means, indicated generally at 36, connects the mud flap 20 to the hub 16. The bracket means 36 comprises first and second substantially U-shaped members 38 and 40, respectively, each having a central aperture in its bight portion 42 and 44, respectively. The legs of the first bracket 38 form apertured flanged end portions 46 which cooperatively receive diametrically opposite lug bolts 18 for connecting this bracket to the hub 16. Similarly the second bracket means 40 has its legs provided with apertured flanged ends 48 which are cooperatively aligned with the vertical flap slots 34 for receiving bolts 50 extended through the slots 34 and threadedly engaged with the apertured bracket leg flanges 48. Lock nuts 52 are threadedly connected with the bolts 50 to fix their position in the bracket and allow vertical sliding movement of the bolts 50 within the slots 34.

A pair of centrally bored step diameter bearings 54 and 56 are respectively received by the bracket bores 42 and 44. The bearings 54 and 56 coaxially receive respective end portions of a connecting pin 58 thus permitting rotative movement of the first bracket 38 with the wheel 12 with respect to the other or second bracket 40 connected with the flap 20. Screws 60 maintain the pin 58 within the bearings. Thus the bracket means 36 prevents lateral flapping or "sailing" movement of the mud flap 20 while the bolts 50, being slidable in the slots 34, permits vertical movement of the flap with respect to the bracket means when the truck wheel and tire 12 is sprung or unsprung with respect to the truck body 10.

Obviously the invention is susceptible to changes or alterations without defeating its practicability, therefore, we do not wish to be confined to the preferred embodiment shown in the drawings and described herein.

We claim:

1. An anti-splash flap support for vehicle wheels, said vehicle having a body supported by a wheel connected with a brake drum having a hub projecting through said wheel, comprising:

an angle bracket connected with said body laterally of the vertical plane of said wheel;

a mud flap secured to and depending from said angle bracket;

at least one stiffener secured to and extending longitudinally of said mud flap intermediate its ends, said mud flap and said stiffener each having an elongated vertical slot extending cooperatively therethrough intermediate their ends;

a first strap bracket connected with said hub and projecting toward said mud flap;

a second strap bracket interposed between said mud flap and said first strap bracket;

bolt means slidably extending through the mud flap and stiffener slot and connected with said second strap bracket; and, bearing means interconnecting said first and second strap brackets permitting relative rotation of the first strap bracket with respect to the said second strap bracket.

2. The flap support according to claim 1 in which the vertical rearward edge portion of said mud flap is turned arcuately inward toward the rearward limit of said wheel, the depending edge portion of said mud flap having a plurality of vertical slits forming a flexible bottom edge portion.

* * * * *